United States Patent [19]

Wilcox et al.

[11] Patent Number: 5,731,731
[45] Date of Patent: Mar. 24, 1998

[54] HIGH EFFICIENCY SWITCHING REGULATOR WITH ADAPTIVE DRIVE OUTPUT CIRCUIT

[75] Inventors: Milton E. Wilcox, Saratoga; Robert C. Dobkin, Monte Sereno; Carl T. Nelson, San Jose, all of Calif.

[73] Assignee: Linear Technology Corporation, Milpitas, Calif.

[21] Appl. No.: 786,500

[22] Filed: Jan. 21, 1997

Related U.S. Application Data

[63] Continuation of Ser. No. 454,595, May 30, 1995, abandoned.

[51] Int. Cl.$^6$ .................................................. H03K 17/693
[52] U.S. Cl. ..................... 327/403; 327/170; 327/389; 327/404; 327/541; 327/543
[58] Field of Search ........................... 327/170, 380, 327/381, 389, 391, 403, 404, 405, 538, 540, 541, 543; 326/87; 323/313, 315, 316

[56] References Cited

U.S. PATENT DOCUMENTS

| | | | |
|---|---|---|---|
| 4,604,731 | 8/1986 | Konishi | 326/87 |
| 4,611,135 | 9/1986 | Nakayama et al. | 327/404 |
| 4,616,142 | 10/1986 | Upadhyay et al. | 327/405 |
| 5,099,192 | 3/1992 | Thayer et al. | 323/315 |
| 5,194,765 | 3/1993 | Dunlop et al. | 326/87 |
| 5,254,883 | 10/1993 | Horowitz et al. | 327/541 |
| 5,457,407 | 10/1995 | Shu et al. | 326/87 |
| 5,475,332 | 12/1995 | Ishimoto | 327/404 |
| 5,483,188 | 1/1996 | Frodsham | 327/380 |

FOREIGN PATENT DOCUMENTS

| | | | |
|---|---|---|---|
| 5-206829 | 8/1993 | Japan | 326/87 |
| 7-222438 | 8/1995 | Japan | |

OTHER PUBLICATIONS

"Maxim Max717–Max721 Palmtop Computer and Flash Memory Power–Supply Regulators," Maxim Integrated Products, Inc., Data Sheet Rev. O, Sunnyvale, California, pp. 4-67 to 4-77, published Oct. 1992.

"Battery Management and DC-DC Converter Circuit Collection: Power–Supply Applications Guide for Portable Equipment," Maxim Integrated Products, Inc., pp. 7-9 and 11, published 1994.

*Primary Examiner*—Terry Cunningham
*Attorney, Agent, or Firm*—Fish & Neave; Robert W. Morris; Douglas A. Cardwell

[57] ABSTRACT

Switching regulator circuits and methods are provided in which the output circuit is adaptable to maintain high efficiency over various load current levels. The regulator circuits generate one or more control signals in response to the load current and selectively route a switch driver control signal to one or more switches in the output circuit. The switches differ in their size, such that the most efficient switch can be used at a particular load current level. At low load current levels, the driver control signal is routed to output circuitry with smaller switch devices, which incur smaller driver current losses for a given frequency of operation, thereby increasing the regulator efficiency. At high load current levels, the driver control signal is routed to large switch devices, which incur greater driver current losses for a given frequency of operation, but which have a lower impedance. The regulator thus maintains high efficiency over a wide range of load currents while operating at a constant frequency.

22 Claims, 5 Drawing Sheets

HIGH EFFICIENCY SWITCHING REGULATOR WITH ADAPTIVE DRIVE OUTPUT CIRCUIT

CROSS REFERENCE TO RELATED APPLICATIONS

This application is a file-wrapper-continuation of U.S. patent application Ser. No. 08/454,595, filed May 30, 1995, now abandoned.

BACKGROUND OF THE INVENTION

The present invention relates to switching regulator circuits. More particularly, the present invention relates to circuits and methods for maintaining high efficiency over broad current ranges in switching regulators that operate at a substantially constant frequency.

The purpose of a voltage regulator is to provide a predetermined and substantially constant output voltage to a load from a voltage source which may be poorly-specified or fluctuating. Generally, there are two different types of regulators: linear regulators and switching regulators.

A linear regulator employs a pass element (e.g., a power transistor) coupled in series with a load and controls the voltage drop across the pass element in order to regulate the voltage which appears at the load. In contrast, a switching regulator employs a switch including a switching element (e.g., a power transistor) coupled either in series or parallel with the load. The switching regulator controls the timing of the turning ON and turning OFF of the switching element (i.e., the duty cycle) in order to regulate the flow of power to the load. Typical switching regulators employ inductive energy storage elements to convert switched current pulses into a steady load current. Thus, power in a switching regulator is transmitted across the switch in discrete current pulses, whereas power in a linear regulator is transmitted across the pass element as a steady flow of current.

In order to generate a stream of current pulses, switching regulators typically include control circuitry to turn the switch ON and OFF. The switch duty cycle, which controls the flow of power to the load, can be varied by a variety of methods. For example, the duty cycle can be varied by either (1) fixing the pulse stream frequency and varying the ON and OFF times of each pulse (i.e., pulse-width modulation, or PWM), or (2) fixing either the ON or OFF time of each pulse and varying the pulse stream frequency.

Fixed-frequency PWM is often the more desirable method because a varying frequency method may result in frequencies in the audible range, especially at sufficiently low duty cycles. This may result in audio voltage noise affecting the performance of audio circuits powered by the switching regulator. Another problem of a variable switching frequency is that the harmonics of the switching frequency may interfere with intermediate frequency (IF) or radio frequency (RF) communication circuits.

Whichever method is used to control the duty cycle, switching regulators are generally more efficient than linear regulators (where efficiency is the ratio of the power provided by the regulator to the power provided to it). In linear regulators, the pass element is operated in its linear region where the pass element conducts current continuously. This results in the continuous dissipation of power by the pass transistor. In switching regulators, to the contrary, the switch is either OFF (where little power is dissipated by the switch) or ON and in a low impedance state (where a small amount of power is dissipated by the switch). This difference in operation accounts for the reduced amounts of average power dissipation in switching regulators.

The above-described difference in efficiency can be more apparent when there is a large input-output voltage differential across the regulator. For example, it is not unusual for linear regulators to have efficiencies of less than 25 percent, while switching regulators, performing equivalent functions, operate at efficiencies of greater than 75 percent.

Because of their improved efficiency over linear regulators, switching regulators, and particularly fixed frequency regulators, are typically employed in battery-operated communication systems such as cellular telephones, cordless telephones, pagers, personal communicators, and wireless modems. In such systems, when the switching regulator is supplying close to the rated output current (e.g., during transmission), the efficiency of the overall circuit can be high. However, the efficiency is generally a function of output current and typically decreases at low output current. This reduction in efficiency at low output current can become significant in battery-operated systems where maximizing battery lifetime is desirable.

The relationship between efficiency and output current is reflected in the tradeoffs in selecting the power MOSFET switches used in conventional switching regulators. Two significant components of operating losses in switching regulators are the power dissipated by the switch and switch driver current losses. Large power MOSFETs have a lower channel resistance, and hence dissipate less power than smaller MOSFETs for a given current. However, because of their larger gate area, large MOSFETs have a higher gate charge and result in greater switch driver current losses than smaller MOSFETs, for a given frequency of operation. While switch driver current losses are typically less significant than dissipative losses at high output currents, switch driver current losses lead to significant inefficiencies at low output currents. Reducing the switching frequency will decrease switch driver current losses, but varying frequency is an undesirable method for some applications, such as audio circuits, as discussed above.

In view of the foregoing, it would be desirable to provide a high-efficiency switching regulator circuit.

It would also be desirable to provide a circuit and method for maintaining high efficiency over broad current ranges, including low output currents, in a switching regulator.

It would be further desirable to provide a circuit and method for maintaining high efficiency over broad current ranges, including low output currents, in a switching regulator that operates at a constant frequency.

SUMMARY OF THE INVENTION

It is therefore an object of the present invention to provide a high-efficiency switching regulator circuit.

It is also an object of the present invention to provide a circuit and method for maintaining high efficiency over broad current ranges, including low output currents, in a switching regulator.

It is also an object of the present invention to provide a circuit and method for maintaining high efficiency over broad current ranges, including low output currents, in a switching regulator circuit that operates at a constant frequency.

In accordance with these and other objects of the invention, there is provided a switching regulator circuit and method which includes an adaptable output circuit to maintain high efficiency over various load current levels. The regulator circuits generate one or more control signals in response to the load current and selectively route a driver control signal to one or more switches in the output circuit. The switches differ in their size, such that the most efficient switch can be used at a particular load current level. At low load current levels, the driver control signal is routed to output circuitry with smaller switch devices, which have a higher impedance, but which incur smaller driver current losses for a given frequency of operation, thereby increasing the regulator efficiency. At high load current levels, the driver control signal is routed to large switch devices, which incur greater driver current losses for a given frequency of operation, but which have a lower impedance.

The circuit and method of the present invention can be used with various types of power transistor switches, such as synchronous and non-synchronous switches. Additionally, the circuit and method can be used with switches in various types of switching regulator configurations, including voltage step-down, voltage step-up, polarity-inverting, and flyback configurations.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
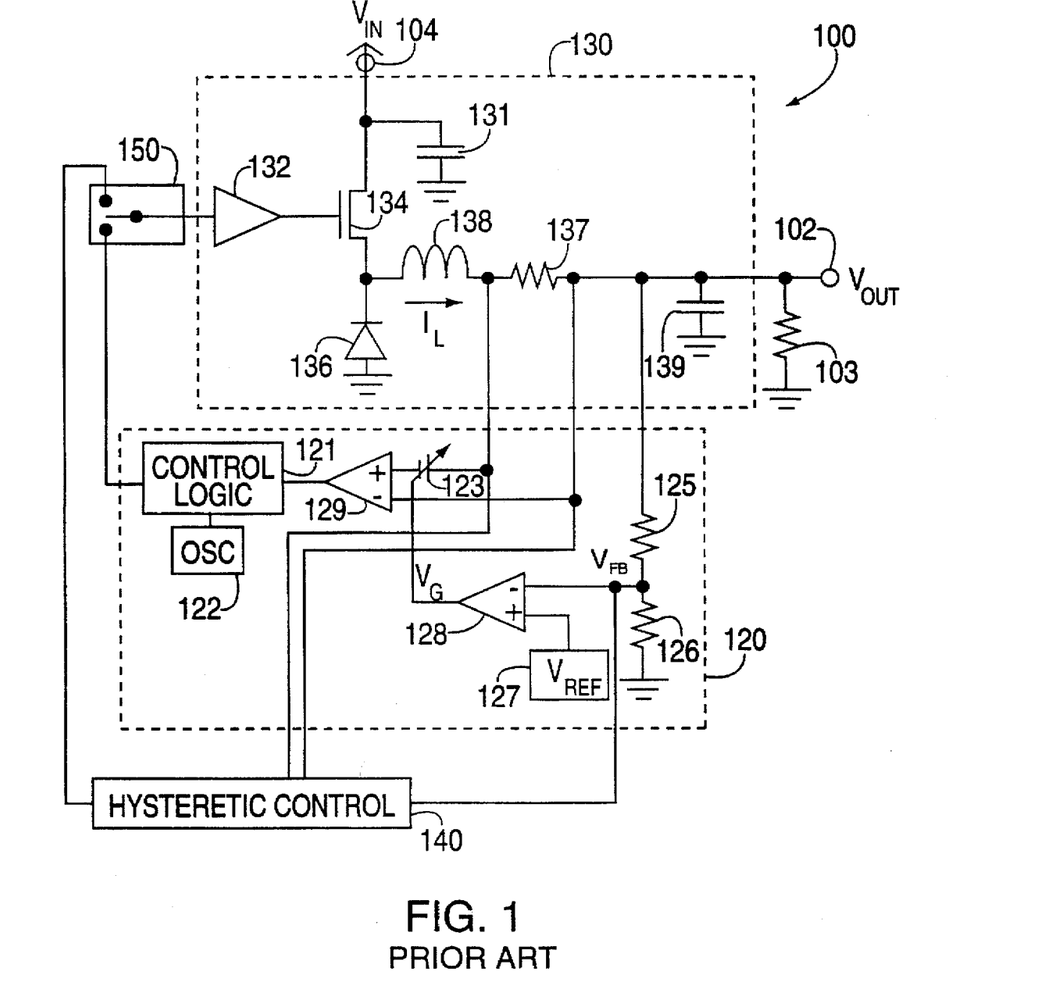
FIG. 1 is a schematic block diagram of a prior art non-synchronous step-down switching regulator circuit employing conventional PWM and hysteretic control circuits.

FIG. 1 shows a simplified schematic diagram of a known non-synchronous step-down switching regulator circuit in which a hysteretic control circuit is used to improve efficiency at low load current levels. For further details regarding hysteretic control, see the LTC1147-3.3/LTC1147-5 datasheet in the 1994 *Linear Databook*, published by Linear Technology Corporation, Milpitas, Calif., the disclosure of which is incorporated herein by reference in its entirety. The datasheet describes the LTC1147-3.3 and LTC1147-5 High Efficiency Step-Down Switching Regulator Controllers, commercially available from Linear Technology Corporation, Milpitas, Calif.

Referring to FIG. 1, switching regulator circuit 100 provides a regulated DC output voltage $V_{out}$ (e.g., 5 volts) at terminal 102 for driving load 103 which, while simply shown as a resistor, may be, for example, a portable communication device or other battery-operated system. Regulator 100 operates from an unregulated supply voltage $V_{in}$ coupled to terminal 104 (e.g., a 12 volt battery).

Regulator 100 includes PWM control circuit 120, hysteretic control circuit 140, control selector 150, and output circuit 130. Control selector 150 determines whether PWM circuit 120 or hysteretic circuit 140 controls output circuit 130. Output circuit 130 provides current at a regulated voltage to terminal 102.

Output circuit 130 includes capacitor 131, driver 132, MOSFET 134, diode 136, resistor 137, inductor 138, and capacitor 139. MOSFET 134, which may be p-channel or n-channel, and diode 136 each operate as switching elements. MOSFET 134 is coupled in series with diode 136 between supply voltage $V_{in}$ and ground to form a non-synchronous switch circuit. As used herein, the term "non-synchronous switch circuit" refers to a switch including one switching transistor and one diode, wherein the transistor is driven by a drive signal and the diode responds passively, such that the transistor and diode switch ON and OFF out of phase with each other to supply current to a load.

MOSFET 134 and diode 136 alternately supply current to output capacitor 139 through output inductor 138. Inductor 138 and capacitor 139 smooth the alternating supply of current to supply a regulated voltage to load 103. Resistor 137, which is coupled in series between inductor 138 and terminal 102, is a small sense resistor used to generate a voltage signal proportional to the current $I_L$ flowing through inductor 138. In order to supply the alternating current, MOSFET 134 is driven by driver 132, which is controlled by PWM control circuit 120 or hysteretic control circuit 140.

PWM control circuit 120 is a current mode pulse-width-modulator (PWM) circuit which controls the duty cycle of driver 132 at high average load currents to regulate the current through inductor 138 such that output voltage $V_{OUT}$ is equal to the desired regulator voltage. Oscillator 122 causes control logic 121 to provide an ON pulse at a constant frequency to driver 132. Each ON pulse causes driver 132 to turn MOSFET 134 ON, thereby turning diode 136 OFF, and causing inductor current $I_L$ to increase.

Control logic 121 turns MOSFET 134 OFF when comparator 129 indicates that current $I_L$ has reached the level set by differential amplifier 128. Current $I_L$ generates a voltage across sense resistor 137 that trips comparator 129 when the voltage exceeds controllable offset voltage 123. Offset voltage 123 is linearly proportional to the voltage $V_G$ at the output terminal of differential amplifier 128. When control logic 121 provides an OFF pulse to turn MOSFET 134 OFF, $I_L$ flows through diode 136 in conventional fashion, but ramps down.

Differential amplifier 128 compares feedback voltage $V_{FB}$, obtained by dividing output voltage $V_{OUT}$ across resistors 125 and 126, to voltage reference 127 which is indicative of the desired output voltage. When $V_{FB}$ decreases slightly due to an increase in load current, voltage $V_G$ increases, thereby increasing offset voltage 123. This in turn causes comparator 129 and control logic 121 to increase the peak current through inductor 138 during each switch cycle to the level demanded by the load.

As discussed above, the power loss resulting from gate charge current is a function of MOSFET gate charge and switching frequency, and becomes significant at low output currents. To provide high-efficiency at low load currents (e.g., less than 20 percent of the maximum rated output), regulator 100 employs hysteretic control circuit 140 for controlling the switching of MOSFET 134 instead of PWM control circuit 120.

At low load currents, control selector 150 allows hysteretic control circuit 140 to control driver 132. Hysteretic control circuit 140 turns MOSFET 134 ON less frequently in this state of operation under conditions where the output voltage $V_{OUT}$ can be maintained substantially at the regulated voltage by output capacitor 139 for a substantial period of time. This hysteretic control method is discussed in more detail in the LTC1147-3.3/LTC1147-5 data sheet previously mentioned and incorporated by reference. This feature of the prior art reduces the losses in the regulator circuit because MOSFET 134 switches on at a much lower frequency, thus drawing less gate charge current. Changing between PWM and hysteretic control modes can be accomplished manually or automatically. For example, the LTC1147 switches modes automatically by limiting the minimum output current in PWM mode and detecting an increase in voltage at the output.

In the above-described state of operation (i.e., "hysteretic mode"), the load 103 is supported substantially by output capacitor 139. Hysteretic control circuit 140 monitors the feedback voltage $V_{FB}$ When $V_{FB}$ falls by a hysteresis amount, control circuit 140 causes driver circuit 132 to turn MOSFET 134 ON only as required to recharge the output capacitor 139 by the hysteresis amount. If the load current remains sufficiently low, capacitor 139 will recharge by the hysteresis amount after only one ON cycle of MOSFET 134, after which MOSFET 134 is turned OFF.

Thus, during light loads, regulator 100 is adapted to turn MOSFET 134 ON only briefly to recharge the output capacitor 139. Therefore, Vou$_{OUT}$ oscillates between upper and lower thresholds. Circuit 140 adjusts the rate at which MOSFET 134 turns ON to recharge output capacitor 139 in response to the load current, thus maintaining high efficiencies even at low output currents.

Figure 2:
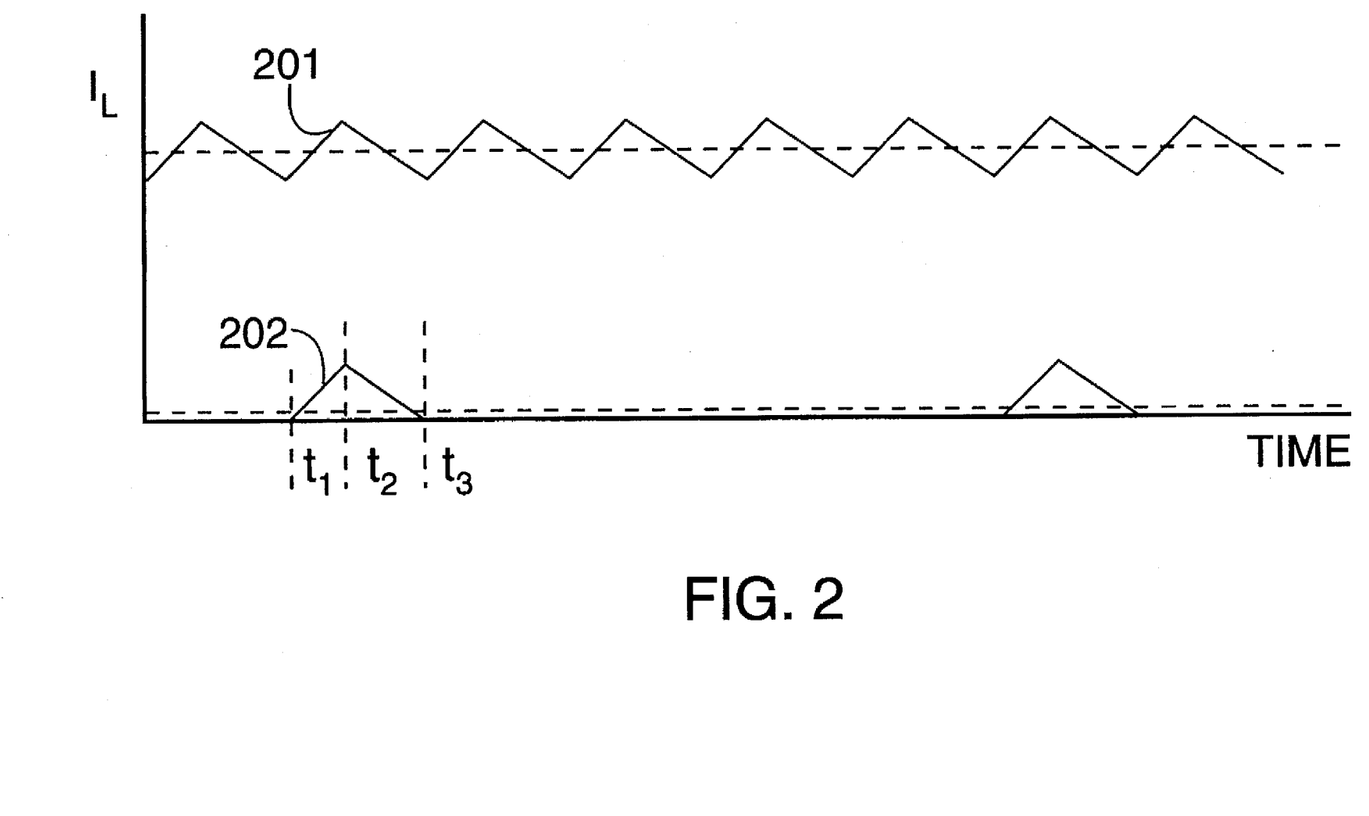
FIG. 2 is a general illustration of the inductor current waveforms of the prior art high-efficiency control circuit of FIG. 1 in PWM and hysteretic modes of operation.

FIG. 2 is a general illustration of the current $I_L$ flowing through inductor 138 during both PWM and hysteretic modes of operation. Referring to FIG. 2, trace 201 shows that $I_L$ ramps up and down as MOSFET 134 is switched ON and OFF respectively over each switch cycle in PWM mode. Trace 202 shows $I_L$ in hysteretic mode. As trace 202 shows, $I_L$ increases during period $t_1$, during which MOSFET 134 is switched ON to recharge output capacitor 139. During period $t_2$, MOSFET 134 is turned OFF, diode 136 turns ON, and $I_L$ quickly ramps down. During period $t_3$, the load current slowly discharges capacitor 139 until it has discharged by the predetermined hysteresis value. As the load current decreases, $V_{FB}$ decreases at a lower rate, lengthening period $t_3$. Thus, the frequency at which MOSFET 134 is turned ON decreases and the gate charge current decreases proportionately.

The variation in the switching frequency of MOSFET 134 in hysteretic mode can be undesirable in certain applications. One disadvantage appears in audio circuit applications, where the switching frequency may decrease into the audio frequency range while operating at sufficiently low load currents. This may result in audio output voltage noise which may contaminate audio circuits powered by the switching regulator.

An additional disadvantage of the variable-frequency hysteretic mode of switching regulator 100 is that inductor 138 itself may produce audible noise which may be objectionable to a user of the device employing the regulator circuit.

A further disadvantage of variable-frequency switching regulators in communication circuits is that harmonics of the switching frequency may interfere with the IF or RF frequency communications circuits. The high frequency harmonics of the switching frequency may drift into frequency ranges reserved for IF or RF signals.

An alternative known method of maximizing efficiency of switching regulators is to provide two or more complete switching regulators, each of which is most efficient at a particular output current, and control circuitry which switches the output between the regulators. This approach, with manual switching between the regulators, is suggested by *Battery Management and DC-DC Converter Circuit Collection*, published by Maxim Integrated Products, Inc., Sunnyvale, Calif., page 9, (1994). A disadvantage of this second alternative approach is that it requires two complete regulators and is therefore more expensive and cumbersome than a single regulator.

Figure 3:
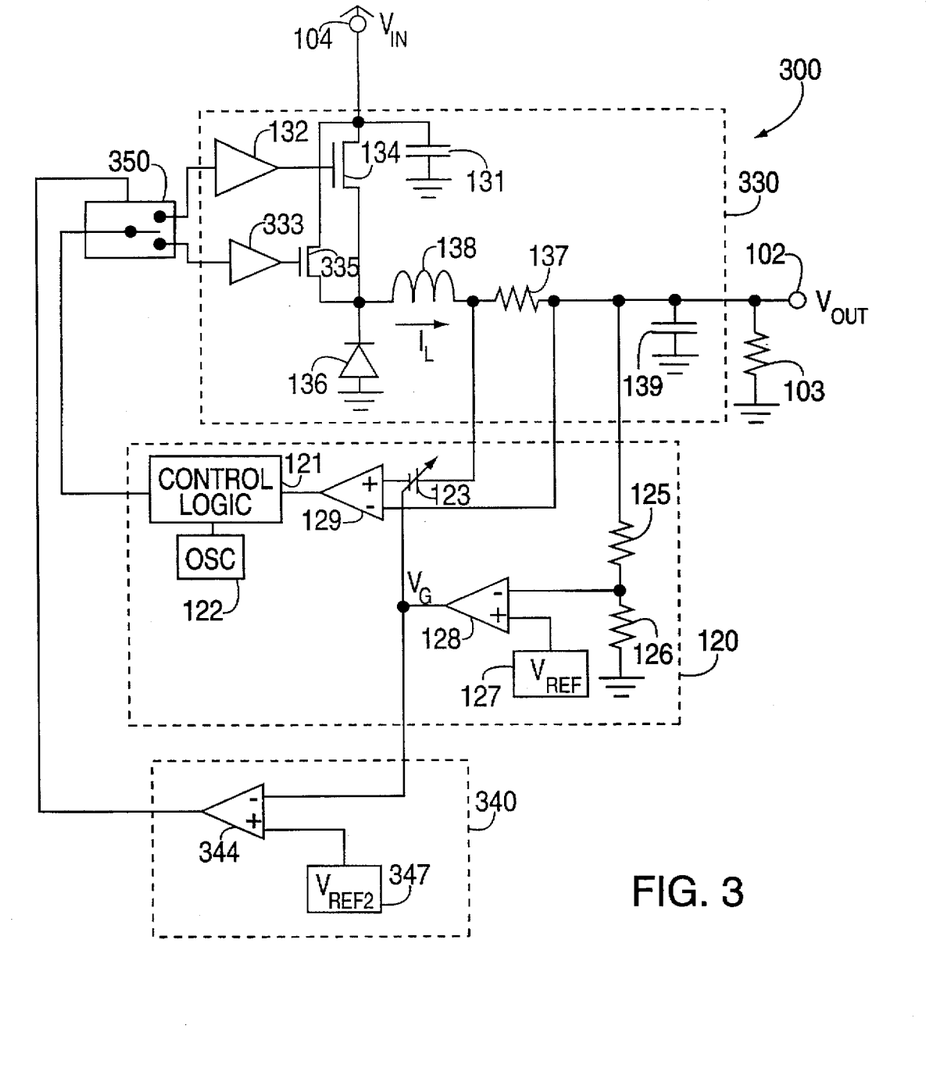
FIG. 3 is a schematic block diagram of a first embodiment of a high-efficiency switching regulator circuit and method in accordance with the principles of the present invention, in a non-synchronous step-down configuration.

The deficiencies of the switching regulator circuits described above are overcome by the switching regulator circuits and methods of the present invention. FIG. 3 shows a constant frequency switching regulator circuit 300 which, in accordance with the principles of the present invention, includes an adaptable output circuit for high efficiency over broad current ranges.

Referring to FIG. 3, switching regulator 300 also includes PWM control circuit 120 of FIG. 1. The PWM control circuit may be of the type described above in connection with FIG. 1 or it may be implemented utilizing other known PWM control circuits. As shown in FIG. 3, PWM control circuit 120 is substantially the same as PWM control circuit 120 of FIG. 1. The only exceptions relate to connections for external circuitry to monitor signals (e.g., in FIG. 1, hysteretic control circuit 140 has connections to PWM circuit 120, while in FIG. 3, output control circuit 340 is connected to PWM circuit 120 instead.) Circuit 300 also includes adaptable output circuit 330, output control circuit 340, and control routing circuit 350. As described in greater detail below, output control circuit 340 and control routing circuit 350 cause output circuit 330 to operate with small MOSFET 335 rather than large MOSFET 134 at low load current levels. This feature of the present invention reduces the switch driver power consumption because MOSFET 335 has a smaller gate charge than MOSFET 134.

In accordance with the present invention, switching regulator 300 adapts output circuit 330 to operate at low load current levels as follows. Output control circuit 340 includes comparator 344 and voltage reference 347 which supplies a reference voltage $V_{REF2}$. As described above with reference to FIG. 1, output $V_G$ of differential amplifier 128 decreases in response to decreasing load current, and therefore serves as an indicator of load current. The voltage at the output of comparator 344 goes high when the load current decreases to the point that $V_G$ falls below $V_{REF2}$. $V_{REF2}$ is preferably chosen to be indicative of the level of $V_G$ and, hence, the load current at which large MOSFET 134 is no longer required so that small MOSFET 335 can supply the necessary load current.

Output circuit 330 includes the following components of output circuit 130 of FIG. 1: capacitor 131, switch driver 132, MOSFET 134, diode 136, capacitor 139, inductor 138, and resistor 137. Output circuit 330 also includes small switch driver 333 and small MOSFET 335, which form a second switch circuit. Driver 333 and MOSFET 335 are preferably smaller than driver 132 and MOSFET 134 respectively. In response to a low voltage at the output of comparator 344, control routing circuit 350 routes the control signal from PWM circuit 120 to driver 132, which operates MOSFET 134. In response to a high voltage at the output of comparator 344 control routing circuit 350 removes the control signal from driver 132 and instead routes it to driver 333.

Each switch driver may include an idle state which turns OFF its respective MOSFET when control routing circuit 350 removes the control logic signal from its input, as is well known to those of ordinary skill in the art. Thus, at low load currents, when the voltage at the output of comparator 344 is high, the control signal from PWM control circuit 120 controls the switching of MOSFET 335 to supply the necessary current to inductor 138. Also, when the voltage at the output of comparator 344 is high, large MOSFET 134 is not operated, thereby eliminating the switch driver current losses associated with charging its gate.

Thus, in accordance with the present invention, circuit 300 maintains high efficiency over broad current ranges while operating at a constant frequency. In a typical application, $V_{REF2}$ may be set at a level equivalent to the voltage of $V_G$ which corresponds to a load current approximately one-tenth the maximum rated output. In that case, regulator 300 switches from large MOSFET 134 to small MOSFET 335 at one tenth the maximum rated output current. Therefore, small MOSFET 335 is typically one-tenth the size of large MOSFET 134. Thus, efficiency similar to that of prior art regulators, when operating at higher load currents, is extended over another decade of load current range by the adaptable output circuit of the present invention.

Figure 4:
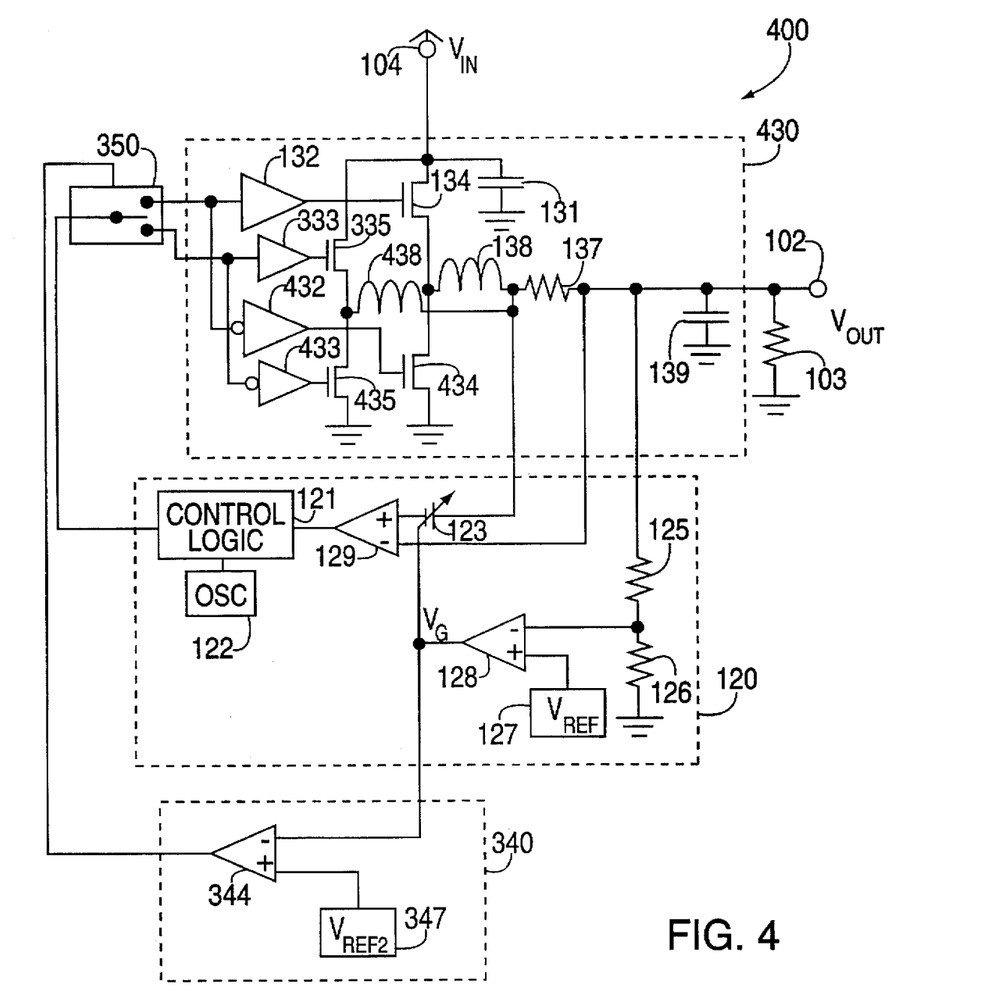
FIG. 4 is a schematic block diagram of a second embodiment of a high-efficiency switching regulator circuit and method in accordance with the principles of the present invention, in a synchronous step-down configuration.

It will be apparent to those of ordinary skill in the art that although the present invention has been discussed above with respect to FIG. 3, wherein the regulator includes non-synchronous switch circuits, the present invention may also be used in a regulator incorporating a synchronous switch circuit as well. As used herein, the term "synchronous switch circuit" refers to a switch including at least two switching transistors that are driven out of phase with respect to each other to supply current at a regulated voltage to a load. FIG. 4 shows a schematic diagram of a high-efficiency switching regulator with adaptable output circuit of the present invention in a synchronously switched step-down configuration.

Referring to FIG. 4, switching regulator circuit 400 includes PWM control circuit 120, output control circuit 340, and control routing circuit 350, which all operate in a manner substantially similar to the like-numbered components of regulator 300 of FIG. 3. Circuit 400 also includes synchronously switched output circuit 430 which replaces output circuit 330 of FIG. 3. As described in greater detail below, output control circuit 340 and control routing circuit 350 cause output circuit 430 to operate with either a large pair or a small pair of synchronously switched switching transistors.

Referring to FIG. 4, output circuit 430 includes the following components of output circuit 330 of FIG. 3: top MOSFETS 134 and 335, drivers 132 and 333, capacitor 131, inductor 138, resistor 137, and capacitor 139. Output circuit 430 also includes inductor 438, drivers 432 and 433, and bottom MOSFETS 434 and 435, wherein MOSFET 434 is preferably larger than MOSFET 435, and preferably by the same ratio as MOSFETs 134 and 335. MOSFET pair 134 and 434 and MOSFET pair 335 and 435 each form individual synchronous switch circuits. In response to a high voltage from the PWM circuit 120 control signal, either driver 132 turns ON MOSFET 134 to increase the current through inductor 138, or driver 333 turns ON MOSFET 335 to increase the current through inductor 438. Bottom MOSFETs 434 and 435 remain OFF in either case. In response to a low voltage from the PWM circuit 120 control signal, either driver 432 turns ON bottom MOSFET 434 to decrease the current through inductor 138, or driver 433 turns ON bottom MOSFET 435 to decrease the current through inductor 438. Top MOSFETs 134 and 335 are kept OFF in both circumstances. In accordance with the principles of the present invention, output control circuit 340 causes control routing circuit 350 to route the drive signal from PWM circuit 120 to either large MOSFET drivers 132 and 432 or small MOSFET drivers 333 and 433 in response to the sensed load current, as previously described with reference to circuit 300 in FIG. 3.

The addition of inductor 438 provides several benefits. First, inductor 438, because it is used at low load current, is typically larger than inductor 138. This reduces the peak current flowing through MOSFETs 335 and 435, and thereby reduces dissipative losses. Second, coupling MOSFETs 335 and 435 to inductor 438, rather than inductor 138, reduces the voltage swing on the drains of large MOSFETs 134 and 434 when MOSFETs 335 and 435 are operated, thereby reducing losses caused by capacitive currents flowing in MOSFETs 134 and 434.

Figure 5:
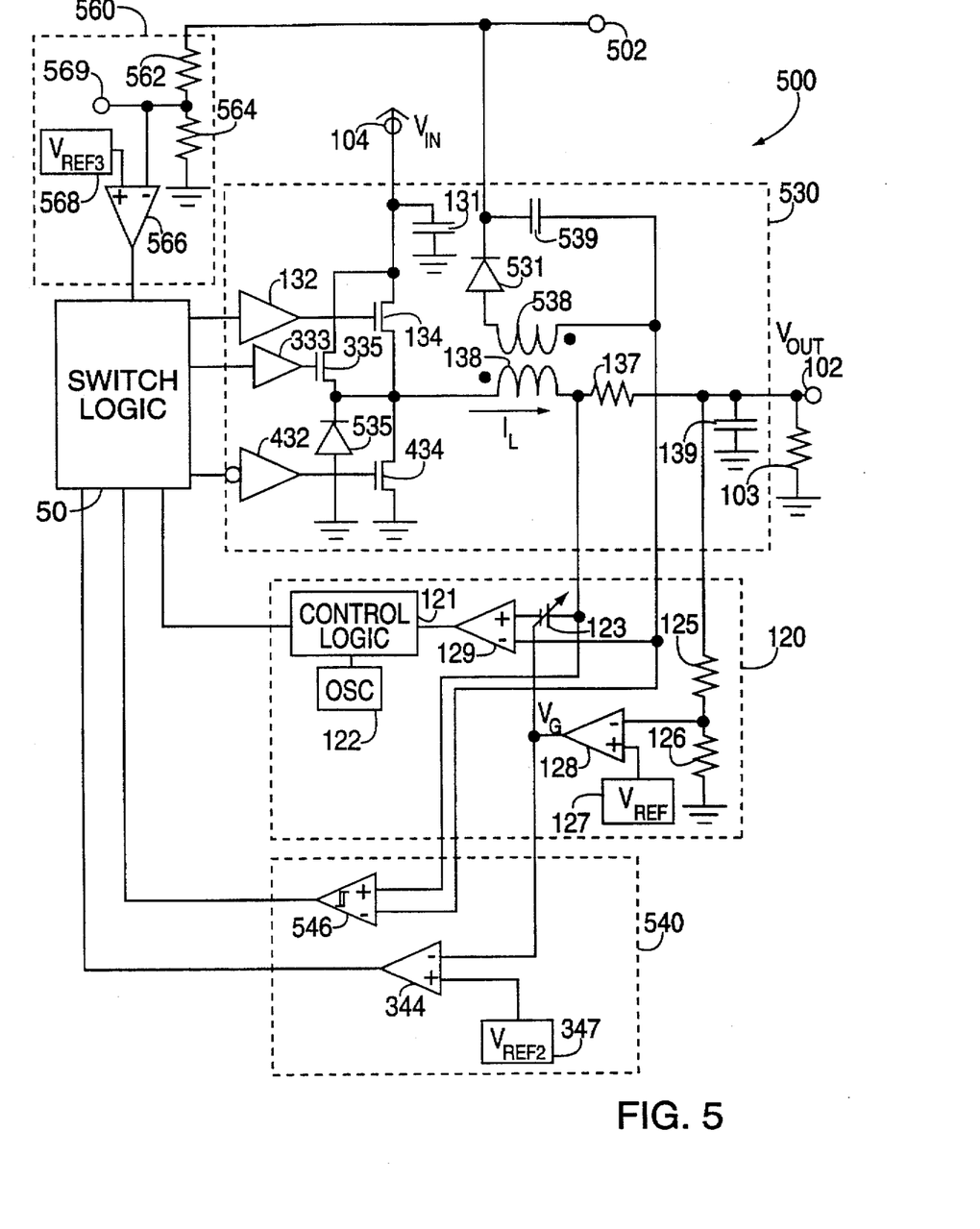
FIG. 5 is a schematic diagram of a third embodiment of a high-efficiency switching regulator circuit and method in accordance with the principles of the present invention, incorporating a flyback boost mode and incorporating an adaptive output circuit including non-synchronous and synchronous switches.

It will be apparent to those of ordinary skill in the art that although the present invention has been discussed with reference to FIGS. 3 and 4, wherein the regulator either selects between two non-synchronous switch circuits or selects between two synchronous switch circuits, the present invention can be used to adapt the size and types of switches in more complex regulator output circuits. It will also be apparent to those of ordinary skill in the art that PWM control circuit 120 is typically designed such that $V_G$ includes a slope compensation component, thus making it a potentially inaccurate indicator of load current. FIG. 5 shows a schematic diagram of a high-efficiency switching regulator circuit of the present invention incorporating a flyback boost mode, an adaptive output circuit including non-synchronous and synchronous switch circuits, and a more complex output circuit control.

Referring to FIG. 5, regulator 500 includes PWM control circuit 120, which operates in a manner substantially similar to PWM control circuit 120 of FIGS. 3 and 4. However, PWM control circuit 120 of FIG. 5 also includes additional external connections to monitor the voltage across resistor 137. Regulator 500 also includes output circuit 530, output control circuit 540, switch logic 550, and flyback override circuit 560. As discussed in greater detail below, output control circuit 540, control circuit 120, and flyback override circuit 560 provide feedback information to switch logic 550 to cause output circuit 530 to operate MOSFET 335 and diode 535 at low load currents, and to operate MOSFETs 134 and 434 at high output currents.

Output circuit 530 includes the following components from FIG. 4: MOSFETS 134, 335, and 434; drivers 132, 333, and 432; capacitor 131; inductor 138; resistor 137; and capacitor 139. Circuit 530 also includes diodes 531 and 535, coupled winding 538, and capacitor 539. MOSFET pair 134 and 434 form a synchronous switch circuit, while MOSFET 335 and diode 535 form a non-synchronous switch circuit. Coupled winding 538, capacitor 539, and diode 531 form a flyback boost circuit that provides a boosted output at terminal 502, as is well known in the art. As is discussed in greater detail below, switch logic 550 provides either synchronous drive signals to drivers 132 and 432, or a non-synchronous drive signal to driver 333, to provide current to inductor 138 to maintain output terminal 102 at the regulated voltage.

In accordance with another feature of the present invention, output control circuit 540 senses inductor current directly and prevents current reversal as follows. Output control circuit 540 includes comparator 344 and voltage reference 347, both of which operate in a manner substantially similar to the like-numbered components of FIG. 3. In the preferred embodiment, voltage reference 347 has a value of 0.63V. Output control circuit 540 also includes hysteretic comparator 546, which senses the voltage generated by current flowing through resistor 137 to provide primary current feedback.

In accordance with the present invention, the output of comparator 546 changes to a high voltage when the voltage across resistor 137 exceeds a hysteresis threshold. Also in accordance with the principles of the present invention, the output of comparator 546 returns to a low voltage when the voltage across resistor 137 decreases and turns negative, indicating the onset of current reversal. The values of the hysteresis threshold of comparator 546 and of resistor 137 are chosen so that comparator 546 changes states in response to a current level at which it is desirable to operate large MOSFETs 134 and 434 in output circuit 530. For example, if resistor 137 has a resistance of 50 milli-ohms, and it is desired to switch operation to the large MOSFETs when the inductor current exceeds 300 mA, the hysteresis threshold is set to 15 millivolts.

Switch logic 550 provides drive signals to output circuit 530 in response to the control signal from PWM circuit 120 and the feedback signals from output control circuit 540 as follows. At relatively low current levels, the output of comparator 344 is at a high state and the output of comparator 546 is at a low state. Under these conditions, switch logic causes the control signal from PWM circuit 120 to be routed to driver 333, thereby driving small MOSFET 335. Also under these conditions, switch logic leaves drivers 132 and 432 idle, such that MOSFETs 134 and 434 remain OFF, as described above with reference to FIGS. 3 and 4.

When either comparator 344 output changes to a low state or comparator 546 output changes to a high state, in response to increasing current through resistor 137, switch logic 550 detects the change and causes the control signal from PWM circuit 120 to be removed from driver 333 and to be routed to drivers 132 and 432. In a preferred embodiment, switch logic 550 delays any change in the routing of the control signal from driver 333 to driver 132 until the beginning of the next ON cycle as follows.

During operation at low current levels, with driver 333 turning small MOSFET 335 ON and OFF, the current $I_L$ through inductor 138 ramps up with each ON cycle of MOSFET 335 and ramps down with each OFF cycle. If load 103 begins drawing more current, error voltage $V_G$ at the output of amplifier 128 increases, thereby causing an increase in offset voltage 123. This increases the threshold at which comparator 129 trips high, and causes the ON cycle to terminate and the OFF cycle to commence. If prior to the end of an ON cycle, inductor current $I_L$ increases to a level great enough to generate a voltage across resistor 137 that exceeds the hysteresis threshold of comparator 546, the resulting transition of the output of comparator 546 to a high voltage causes the control signal from PWM circuit 120 to be routed additionally to driver 432. When the control signal from PWM circuit 120 changes states to commence the OFF cycle, driver 333 turns small MOSFET 335 OFF and driver 432 turns large MOSFET 434 ON. When the output of control logic 121 indicates the end of the OFF cycle, the previously detected transition of the output of comparator 546 to a high voltage causes the control signal of PWM circuit 120 to be routed to driver 132 instead of driver 333. Thus, large MOSFET 134 is turned ON for the ensuing ON cycle.

Also in accordance with the principles of the present invention, switch logic 550 maintains synchronous operation with MOSFETs 134 and 434 until comparator 546 detects a current reversal of inductor current $I_L$, as described above. A current reversal may occur during any OFF cycle, during which time MOSFET 434 is ON, coupling inductor 138 to ground. When the output of comparator 546 changes to a low state, indicating that comparator 546 has detected a current reversal, switch logic 550 immediately removes the PWM circuit 120 control signal from driver 432, causing MOSFET 434 to turn OFF immediately.

If the voltage at the output of comparator 546 remains low for the duration of the ensuing ON cycle, switch logic 550 routes the control signal from PWM circuit 120 to driver 333 rather than driver 132, causing non-synchronous operation with small MOSFET 335 to commence with the subsequent ON cycle. Comparator 546 thus provides the primary means of detecting the conditions under which switch logic 550 selects the appropriate switch circuitry of output circuit 530. In the preferred embodiment, switch logic 550 utilizes the signal at the output of comparator 344 only as an override signal, wherein switch logic 550 causes the control signal from PWM circuit 120 to be routed to drivers 132 and 432, commencing with the next ON cycle, if the signal at the output of comparator 344 changes to a low state.

It will be apparent to those of ordinary skill in the art that the flyback boost mode circuitry, including coupled winding 538, capacitor 539, diode 531, and terminal 502, will not function properly in non-synchronous mode. When output circuit 530 is operating synchronously with MOSFETs 134 and 434, inductor 138 and coupled winding 538 form the primary and secondary windings of a transformer, thereby producing at terminal 502 a voltage greater than that at terminal 102. Coupled winding 538 is typically selected to provide 12 volts at terminal 502 for operating $E^2$PROMs in flash memory devices. However, as described above, switch logic 550 normally selects non-synchronous mode and causes MOSFET 434 to be turned OFF, and inductor 138 to be isolated from ground by diode 535, if comparator 546 detects a current reversal in inductor 138. Inductor 138 and coupled winding 538 cannot function as a transformer when diode 535 isolates inductor 138 from ground.

Therefore, in accordance with another feature of the present invention, flyback override circuit 560 provides a flyback mode override signal that prevents switch logic 550 from selecting non-synchronous mode when a load is placed on boost output terminal 502. Flyback override circuit 560 detects load conditions requiring synchronous operation with large MOSFETs 134 and 434 as follows. Flyback override circuit 560 includes resistors 562, 564, comparator 566, and voltage reference 568.

When a load is placed on terminal 502, resistors 562 and 564 cause the voltage at terminal 569 to drop below $V_{REF3}$ of voltage reference 568. This causes the output of comparator 566 to be held at a high voltage. The high voltage input to switch logic 550 from comparator 566 overrides the feedback signals from output control circuit 540, causing switch logic 550 to route the PWM circuit 120 control signal to synchronous drivers 132 and 432. Also in accordance with the present invention, the user may connect terminal 569 to ground to manually prevent non-synchronous operation at low currents.

It will be apparent that although the principles of the present invention have been discussed above with reference to the synchronous switching regulators of FIGS. 4 and 5, wherein the regulator adapts the size of both switch devices to the load current, the present invention can also be used to adapt the size of only one of the switch devices to the load current.

It will also be apparent that although the principles of the present invention have been discussed above with reference to FIGS. 3–5, wherein the regulator selects between two or more output circuits with different switch sizes, the present invention could also be used to progressively change the number of switches operating in parallel as the load current changes. Further, wherein a drive routing device selects among multiple switch drivers, the principles of the present invention could also be used with a single switch driver, with the selection of output circuits occurring at any point along the driver path.

Additionally, even though the switching regulator is described in connection with step-down and flyback configurations, the principles of the present invention can also be applied with other switching regulator configurations, including voltage step-up, and polarity-inverting configurations. Also, even though the switch circuit has been described for use in a switching regulator, the principles of the present invention are generally suitable for any type of switch in which it is desirable to adapt the switch size in response to operating conditions.

Thus, circuits and methods for maintaining high efficiency over broad current ranges in a constant-frequency switching regulator circuit have been provided.

Persons skilled in the art will thus appreciate that the principles of the present invention can be practiced by other than the described embodiments, which are presented for purposes of illustration and not of limitation, and the present invention is limited only by the claims which follow.

What is claimed is:

1. A switching voltage regulator circuit having an input terminal for connection to a source of input supply voltage and an output terminal for supplying a regulated output voltage to a load, said regulator circuit comprising:

an output circuit coupled between said input terminal and said output terminal for providing a load current at said regulated voltage to said load, said output circuit comprising:

an adaptive switch circuit for coupling current from a first node coupled to said input terminal to a second node, said adaptive switch circuit including:

a first switch circuit coupled between said first and second nodes, and a second switch circuit coupled between said first and second nodes;

a control circuit coupled to said output circuit for providing a control signal to said output circuit, said control signal being based, at least in part, on said regulated voltage at said output terminal;

an out control circuit coupled to said control circuit for providing an output control circuit signal based, at least in part on said load current; and a control routing circuit coupled to said adaptive switch circuit and to said output control circuit for routing said control signal from said control circuit to at least one of said first and second switch circuits and being responsive to said output control circuit signal, whereby said switching regulator circuit maintains high efficiency even at low magnitudes of said load current.

2. The switching regulator circuit of claim 1 wherein said control routing circuit routes said control signal to at least one of said first and second switch circuits in response to the magnitude of said load current as determined by said output control circuit.

3. The switching regulator circuit of claim wherein each of said first and second switch circuits includes a switching transistor, and wherein said switching transistor in said first switch circuit is substantially larger than said switching transistor in said second switch circuit.

4. The switching regulator circuit of claim 2 herein said control signal is provided for turning ON and OFF one of said first and second switch circuits while maintaining the other switch circuit in an OFF state.

5. The switching regulator circuit of claim 3 wherein said control routing circuit routes said control signal to one of said first and second switch circuits in response to the magnitude of said load current determined by said output control circuit.

6. A switching voltage regulator circuit for supplying a regulated output voltage to a load, said regulator circuit comprising:

an input node for connection to a source of input supply voltage;

an output node for connection to said load;

an adaptable output circuit for providing a load current to said load, said output circuit including a plurality of switch circuits, each switch circuit including a first switching element, each of said plurality of switch circuits being coupled to receive said input voltage, and each of said plurality of switch circuits being coupled to said output node;

a control circuit coupled to said output node for providing a control signal that is responsive to the magnitude of said regulated output voltage;

an output control circuit coupled to said control circuit for providing an output control circuit signal that is responsive to the magnitude of said load current; and a control routing circuit coupled to said control circuit, to said output control circuit and to each of said plurality of switch circuits, said control routing circuit routing said control signal to an operative set of at least one of said plurality of switch circuits in response to said output control circuit signal, each of said switch circuits in said operative set being turned ON and OFF in response to said control signal and each of said switch circuits not in said operative set being turned OFF.

7. The switching regulator circuit of claim 6 wherein each of said plurality of switch circuits further includes a second switching element and an inductor, said second switching element and said inductor being coupled to said first switching element.

8. The switching regulator circuit of claim 7 wherein said first and second switching elements of each of said plurality of switch circuits are coupled in series between said input voltage and ground, such that said regulator circuit is in a step-down configuration.

9. A switching voltage regulator circuit comprising:

a plurality of switch circuits, each of which includes first and second switching elements;

an output circuit including an output terminal for supplying current at a regulated voltage to a load, the output circuit being coupled to each of said plurality of switch circuits;

a control circuit coupled to said output circuit and to said output terminal for generating a control signal, said control signal being based at least in part on said regulated voltage supplied at said output terminal;

an output control circuit coupled to said output terminal for generating an output control circuit signal said output control circuit signal being based at least in part on said current supplied at said output terminal; and a control routing circuit coupled to said control circuit, said output control circuit and to each of said plurality of switch circuits, said control routing circuit responsive to said output control circuit signal, said control routing circuit routing said control signal to an operative set of at least one of said plurality of switch circuits and causing the ON times of said first and second switching elements in said selected operative set of at least one of said plurality of switch circuits to vary in response to said control signal, said control routing circuit causing said first and second switching elements not in said selected operative set of at least one of said plurality of switch circuits to be maintained OFF.

10. The switching regulator of claim 9 wherein said control routing circuit routes said control signal to said operative set of at least one of said plurality of switch circuits in response to said current supplied to said load by said regulator as determined by said output control circuit.

11. The switching regulator circuit of claim 10 wherein said plurality of switch circuits includes a first switch circuit and of second switch circuit, said first switch circuit of said plurality of switch circuits includes first and second switching elements, and said second switch circuit of said plurality of switch circuits includes first and second switching elements, said first switching element in said first switch circuit being substantially larger than said first switching element in said second switch circuit, said control routing circuit providing at least first and second drive signals, said first drive signal controlling said first switching element in said first switch circuit and said second drive signal controlling said first switching element in said second switch circuit.

12. The switching regulator circuit of claim 11 wherein said control routing circuit routes said control signal to said output circuit in response to said current supplied to said load by said regulator as determined by said output control circuit such that said regulator operates in one of first and second states, said first state existing when said operative set of at least one of said plurality of switch circuits consists of said first switch circuit, and said second state existing when said operative set of at least one of said plurality of switch circuits consists of said second switch circuit.

13. The switching regulator circuit of claim 12 wherein said control circuit includes a differential amplifier for providing a first feedback signal, said first feedback signal being proportional to a difference between a voltage at said output terminal and a voltage reference, said control routing circuit causing said regulator to operate in a selected one of said first and second states in response to said first feedback signal.

14. The switching regulator circuit of claim 12 wherein said output circuit further comprises a sense resistor coupled to said output terminal, wherein said sense resistor generates a sense voltage indicative of said current being supplied to said output terminal, and said control routing circuit causing said regulator to operate in a selected one of said first and second sates in response to said sense voltage.

15. The switching regulator circuit of claim 14 wherein, in response to said current supplied to said load by said regulator as determined by said output control circuit, said control routing circuit causes said regulator to operate in said first state if said sense voltage exceeds a first threshold, and said control routing circuit causes said regulator to operate in said second state if said sense voltage falls below a second threshold.

16. The switching regulator circuit of claim 15 wherein said switch control signal is of a constant frequency.

17. The switching regulator circuit of claim 16 wherein said switch control signal is pulse-width modulated.

18. The switching regulator circuit of claim 17 wherein said switch control signal is turned OFF when said sense voltage exceeds said first feedback signal.

19. A method for operating a switching voltage regulator, said regulator including (1) a plurality of switch circuits, each switch circuit including first and second switching elements; and (2) an output circuit including an output terminal for supplying current at a regulated voltage to a load, said output circuit being coupled to each of said plurality of switch circuits, said method comprising the steps of:

monitoring a first signal from said output circuit;

generating a control signal in response to said monitored first signal;

monitoring a second signal from said output circuit;

generating a switch signal in response to said monitored second signal;

selecting one of said plurality of switch circuits in response to said switch signal; and varying the ON-time of at least one of said first and second switching elements in said one of said plurality of switch circuits in response to said control signal to maintain said output terminal at said regulated voltage.

20. The method of claim 19 wherein said step of generating said switch signal is in response to said current provided to said load.

21. The method of claim 20 wherein said plurality of switch circuits consists of first and second switching circuits, each of said first and second switching circuits comprising first and second switching elements, said first switching element in said first switching circuit being substantially larger than said first switching element in said second switching circuit, and said step of selecting includes selecting said first switching circuit if the magnitude of said current provided to said load exceeds a threshold amount.

22. The method of claim 21 wherein said step of generating a control signal includes the steps of:

comparing said monitored first signal to a threshold voltage; and generating a control signal in response to said comparison of said monitored first signal and said threshold voltage.

* * * * *